(12) United States Patent
Torres-Quiroga et al.

(10) Patent No.: US 10,004,253 B1
(45) Date of Patent: Jun. 26, 2018

(54) METHOD FOR INCREASING THE HEALTH CONDITION OF CRUSTACEANS IN AQUACULTURE, SURVIVAL RATE AND PIGMENTATION

(71) Applicants: Jose-Odon Torres-Quiroga, Monterrey (MX); Carlos Torres-Gomez, Monterrey (MX)

(72) Inventors: Jose-Odon Torres-Quiroga, Monterrey (MX); Carlos Torres-Gomez, Monterrey (MX)

( * ) Notice: Subject to any disclaimer, the term of this patent is extended or adjusted under 35 U.S.C. 154(b) by 0 days. days.

(21) Appl. No.: 15/695,278

(22) Filed: Sep. 5, 2017

(51) Int. Cl.
*A23L 33/155* (2016.01)
*A01K 61/50* (2017.01)

(52) U.S. Cl.
CPC ............ *A23L 33/155* (2016.08); *A01K 61/50* (2017.01)

(58) Field of Classification Search
None
See application file for complete search history.

(56) References Cited

U.S. PATENT DOCUMENTS 7,381,541 B2 * 6/2008 Flachmann ............ C07H 21/00
424/764
7,383,788 B2 * 6/2008 Rodriguez ............ C07C 403/24
119/230

* cited by examiner

*Primary Examiner* — Brian J Davis
(74) *Attorney, Agent, or Firm* — Young & Thompson

(57) ABSTRACT

This invention is related to a method for improving the health condition of crustaceans grown in captivity and consequently the survival rate, as well as their color, by the incorporation of a carotenoids concentrate obtained from a natural source to the feed of crustacean species, in order to improve the health condition of such aquatic animals. The improved health condition results in a noticeable gain in biomass and in a more attractive color.

4 Claims, 5 Drawing Sheets

METHOD FOR INCREASING THE HEALTH CONDITION OF CRUSTACEANS IN AQUACULTURE, SURVIVAL RATE AND PIGMENTATION

BACKGROUND OF THE INVENTION

Field of the Invention

This invention is related to methods for increasing the productivity of aquatic farms and more particularly to a method for improving the health of a population of crustaceans, as well as their survival rate, as well as their pigmentation by dosing a carotenoid concentrate obtained from a natural source, to the feed of a population of crustaceans, that results in a noticeable weight increase, as well as in an increase of the survival rate, and an improved pigmentation.

Description of the Related Art

Carotenoids are widely distributed in nature. Total annual production in nature is estimated at over 100 million tons. This vast quantity of carotenoids is mainly stored in leaves, algae, bacteria, phytoplankton and zooplankton. However, despite their wide distribution, de novo synthesis has so far been limited to certain microorganisms, fungii, algae and higher plants. Animals, by contrast, depend totally on a dietary intake for their supply of carotenoids since they are only capable to modify the different carotenoids by processing them by digestion.

Carotenoids are terpenoid compounds that besides their typical pigmenting characteristics (yellow, orange or red pigments), function as precursors of molecules with biological activity intervening in different vital biological and physiological processes.

Over 800 different carotenoids have been recognized in nature. Carotenoids are classified in two major groups: carotenes, that are hydrocarbon molecules comprising atoms of carbon and hydrogen only. Representative examples of carotenes include β-carotene and lycopene. And xanthophylls, which are oxygenated derivatives of the carotenes. Representative examples of xanthophylls include lutein, zeaxanthin, astaxanthin, capsanthin and cantaxanthin.

In plants and animals, carotenoids are subject—after synthesis or ingestion- to diverse processes and structural modifications. The carotenoid distribution, as well as the metabolic pathways have been widely studied by previous investigators (Goodwin, 1984; Davies, 1985)

It has been recognized that many aquatic species require an optimum level of carotenoids in their diet in order to properly carry out vital biological, metabolic and reproductive functions (Olson 1993; Weiser and Korman 1993; Bendich 1994; Krinsky 1994).

The biological properties of carotenoids have been studied by different investigators (Torrisen et al. 1989; Meyers and Latscha 1997) as source of Vitamin A, for its antioxidant properties, for its capacity of enhancing the immunological response and stabilization of the cellular membranes and for its capacity of functioning as oxygen reservoirs in some intracellular reactions, and generally in the oxygenation of cells and tissues (Torrisen 1989; Craik 1985; Grung et al. 1993; Watson and Earnest, 1993). Other research studies demonstrate the critical role played by Astaxanthin in marine tropic processes, regarding the conversion of β-Carotene into Astaxanthin through crustacean zooplankton feeding (Ringelberg 1980; Kleppel 1988).

Besides the many functions that provitamin A has in the metabolism of animals, carotenoids are also involved in a number of further physiological functions. Of particular interest in this regard is the beneficial effect of carotenoids on the endocrine system with respect to gonadal development and maturation of fertilization, of hatching, viability and growth, particularly in fish and crustaceans (Deufel, 1965, 1975; Hartmann et al., 1947; Meyers, 1997) and on the reproductive processes in a variety of many animal classes and species, e.g. birds, cattle, horses and pigs (Bauernfeind, 1981). Although the specific role of carotenoids has not been established in detail during embryogenesis and vitelogenesis, some authors suggest that a good level of carotenoids help protect the embryos nutrient reserves from oxidation and sunlight damage (UV radiation) (Nelis et al., 1989).

The major pigment in most aquatic animals is Astaxanthin, but they differ fundamentally in their ability to synthesize this highly oxidized carotenoid from precursors. The crustaceans (omnivorous, lower order animals with a highly developed biosynthetic capability) are able to convert various algal carotenoids (e.g. lutein and zeaxanthin) and Beta-carotene into the major pigment, Astaxanthin. This carotenoid primarily occurs as protein complexes of free, mono- and diesters in the exoskeleton of most crustaceans (Meyers, 1986).

Astaxanthin is found as a major pigment in certain plankton forms, and numerous fishes (e.g. salmonids) and crustaceans. Besides its role as a pigment, Astaxanthin also has a number of metabolic functions, of which the most significant are probably its effects on reproduction and its provitamin A (Schiedt et al., 1985).

It has been established that Astaxanthin plays an important physiological function by acting as a chelating agent, or free radical quencher, of toxic metabolites produced at the intracellular level, and its potency is described as many times more efficient than Vitamin E (Miki, 1991). Several research studies report that the formation of carotenoproteins and carotenolipoproteins positively affects the cell membrane wall (Bendich, 1989; Prabahla et al., 1989; Menasveta, 1993).

The immunological system of crustaceans is very primitive, and basically it functions by means of hemocytes that function either as fagocytes, encapsulators, aglutinators or lysing invasive exogenous agents.

Crustaceans are omnivores and feed on phytoplankton and zooplankton. From the evolutionary point of view it is not surprising that these animals show a broader metabolic diversity than do fish and birds to modify their dietary carotenoids to suit their tissue-specific molecules (Schiedt, 1998)

In the natural environment phytoplankton and zooplankton are the source of Astaxanthin and Astaxanthin precursors for those organisms that follow in the feeding chain, such is the case of fishes and crustaceans. However, nature cannot provide the required amounts for aquaculture operations, and even less in intensive operations; it is therefore recommended the use of Astaxanthin in artificial diets as a supplement (Meyers and Latscha, 1997).

Today's intensive production methods which have developed to keep pace with requirements and quality standards result in a situation in which natural pigment sources can no longer provide an adequate carotenoid supply. Nowadays, the appropriate pigmentation of products demanded by consumers usually requires pigment additives.

Although carotenoid effects in crustaceans have been widely studied and documented, and there is ample evidence of their presence in many microalgae, fungii and bacteria in most marine waters, all previous efforts to supplement Astaxanthin in crustaceans have been devoted to incorporate in the feeds Astaxanthin from various sources, either obtained synthetically-Carophyll Pink (Roche, BASF)- or from natural sources (*Haematoccocus pluvialis, Phaffia rhodozyma*, shrimp meal, etc), but no known effort has been made to administer an optimum level of Astaxanthin precursors such as Lutein and Zeaxanthin, or their long chain fatty esters such as palmitic, stearic and oleic.

The method of the present invention comprises the dosing of Lutein, Zeaxanthin and Lutein concentrates, marigold oleoresin, marigold meal, and Zeaxanthin and Lutein Long Chain Diesters like stearates, oleates, and palmitates, derived from *Tagetes erecta*, to crustacean feeds that noticeably increase the survival rate and the growth rate of populations raised in captivity.

SUMMARY OF THE INVENTION

It is therefore a main object of the present invention to provide a method for increasing the survival rates of crustaceans by dosing a Carotenoid extract derived from marigold with a content of Zeaxanthin or Zeaxanthin Long Chain Diesters that comprise from 10% to 90% of the total xanthophylls, to the feed of a population of crustaceans.

It is also a main object of the present invention to provide a method of the above disclosed nature in which the carotenoid concentrate is readily and efficiently converted into Astaxanthin by crustaceans.

It is an additional purpose of the present invention to provide a method of the above disclosed nature in which the carotenoid concentrate noticeably improves the health condition of a crustacean population in such a way that the growth rate is increased.

It is yet a main object of the present invention to provide a method of the above disclosed nature in which the carotenoid concentrate acts as a precursor of Vitamin A.

It is a further object of the present invention to provide a method of the above disclosed nature in which the carotenoid concentrate stimulates the immunological system of a crustacean population.

It is another main purpose of the present invention to provide a method of the above disclosed nature in which the carotenoid concentrate increases the survival rate of a crustacean population.

It is yet a main object of the present invention to provide a method of the above disclosed nature in which the carotenoid concentrate is readily converted into Astaxanthin by crustaceans and consequently improves the color of such population, as well as the survival rate.

It is a further object of the present invention to provide a method of the above disclosed nature in which the Astaxanthin precursor is readily and efficiently converted by crustaceans into Astaxanthin by which there are obtained similar benefits than dosing more expensive sources of Astaxanthin to the crustacean feeds.

DETAILED DESCRIPTION OF THE INVENTION

Figure 1:
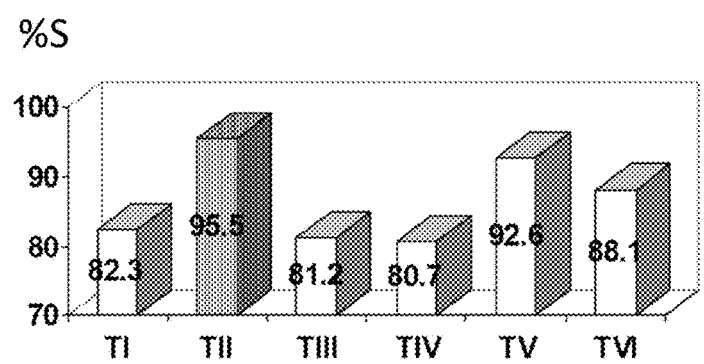
FIG. 1 is a graph showing Post-larvae survival of *L. vanname* under various feeding treatments including dosing a carotenoid concentrate rich in Lutein, Zeaxanthin or in Lutein/Zeaxanthin Long Chain Diesters.

The following examples illustrate the benefits obtained by dosing a carotenoid concentrate rich in Lutein, Zeaxanthin or in Lutein/Zeaxanthin Long Chain Diesters to crustacean feeds, which can be obtained from marigold oleoresin with a total xanthophylls content of 75 gr/kg to 150 gr/kg. or from *capsicum* species meal with a total xanthophylls concentration of 3 gr/kg to 16 gr/kg. Such results were obtained in a series of experiments and evaluations carried on at aquaculture laboratories, experimental farms, and commercial operations.

The Lutein and Zeaxanthin concentrates, or the Lutein/Zeaxanthin Long Chain Diester concentrates, were incorporated in all instances as a powder carried in a premix, or in beadlets form, or microencapsulated with gelatin or carbohydrates or starches, or as an oil dispersion that readily mixes with the other feed ingredients; and were fed as crumbles, or pellets of different sizes, according to the crustacean requirements. The Lutein, Zeaxanthin or the Lutein/Zeaxanthin Long Chain Diesters concentrates are very stable and losses due to heat treatment during the feed preparation were minimal.

The content of Lutein, Zeaxanthin or Lutein/Zeaxanthin Long Chain Diesters in the feeds, were analyzed for total xanthophylls at each experiment, and every time that a new feed lot was prepared, following the AOAC Spectrophotometric Method of Analysis (A.O.A.C., 1984, 14$^{th}$ Edition).

The concentration of total pigment in crustacean specimens extract was carried out by UV/VIS spectrophotometric methods measurement absorbance at 470 nm (A 1%=2100 in Hexane).

The analysis of free, mono and diester-Astaxanthin, β-carotene, lutein, and zeaxanthin were quantified by HPLC on a $H_3PO_4$ modified silica gel column.

The Astaxanthin enantiometers deposited by the crustaceans specimens, or from its different organs, were quantified by HPLC after derivatization into the corresponding dicamphanates (Vecchi and Muller 1979).

The Lutein/Zeaxanthin and the Lutein/Zeaxanthin Long Chain Diesters have the following chiral composition: 3R, 3'R Zeaxanthin min. 20% and 3R,3'S Meso Zeaxanthin max 80%.

The Astaxanthin deposited by shrimp which received feed enriched with synthetic Astaxanthin (Carophyll Pink) have the following chiral composition in the deposited Astaxanthin:

3R,3'R Astaxanthin (Cis+Trans): 15.1%
    3R,3'S Meso-Astaxanthin (Cis+Trans): 37.6%
    3S,3'S Astaxanthin (Cis+Trans): 47.3%

The Astaxanthin deposited by shrimp which received feed enriched with the Lutein/Zeaxanthin and the Lutein/Zeaxanthin Long Chain Diesters have the following chiral composition in the deposited Astaxanthin:

3R,3'R Astaxanthin (Cis+Trans): 15.8%
    3R,3'S Meso-Astaxanthin (Cis+Trans): 38.2%
    3S,3'S Astaxanthin (Cis+Trans): 45.9%

EXAMPLES

The following examples illustrate the beneficial effect of the inclusion of a Lutein/Zeaxanthin Concentrate or Lutein/Zeaxanthin Long Chain Diester Concentrate obtained from a natural source in the feed of shrimp at different stages of their life cycle. These examples are presented for illustrative purposes only and for a better understanding of the invention. However, they are not intended to limit the scope of the present invention.

Example 1

1. —Dietary effect of the inclusion of Lutein/Zeaxanthin or their Long Chain Diesters in the feed of a white shrimp *Litopenaeus vannamei* postlarvae (pl 7) cultivation.

An experiment was carried out with 6 treatments and three repetitions where white shrimp *L. vannamei* postlarvae (pl 7) were fed during 11 days with six different feed strategies. Treatments I to III included artemia nauplii. Besides artemia, Treatment I was provided with commercial feed (40% protein). Treatment II was supplemented with a commercial feed containing 138 ppm of xanthophylls, by including Lutein/Zeaxanthin Long Chain Diesteres in the formulation. Treatment III was provided with a microencapsulated commercial brand feed. Treatments IV to VI were provided with the same feed, but without artemia nauplii.

It can be observed in the graph of FIG. 1 that the Treatments including artemia nauplii (I to III), as well as those that did not include artemia (IV to VI), as compared with the experimental populations that were fed with Lutein/Zeaxanthin Long Chain Diesters, group II, had a noticeable improvement in their survival (ANOVA 0.05%)

Example 2

2. —Effect of dosing Lutein and Zeaxanthin Long Chain Diesters in the feed of pre-juvenile (0.115 g) white shrimp *Litopenaeus vannamei*, grown under high density conditions.

An experiment was carried out comprising two treatments and three repetitions where pre-juvenile white shrimp *L. vannamei* were grown during 7 weeks, seeded at a high density (330 specimens/m$^2$) in order to create a stress condition. In Treatment I a commercial feed was provided (40% protein). In Treatment II the commercial feed (40% protein) contained 138 ppm of Xanthophylls from Lutein/zeaxanthin Long Chain Diesters As can be observed in Table I, the average weight as well as the average survival rate was significantly larger (ANOVA 0.05%) when the Long Chain Diesters such as dipalmitates, or di oleates and distearates was used, as compared against those individuals that did not receive the carotenoid dose.

TABLE I

Final individual average weight and percentage of survival on Pre-juveniles of *L. vannamei*.

| | Final average weight (g) | Survival % |
|---|---|---|
| Treatment I (Control) | 2.02 | 66.6 |
| Treatment II (Long Chain Diesters) | 3.05 | 75.7 |

Example 3

3. —Dietary effect of dosing different concentrations of Lutein or Zeaxanthin Long Chain Diesters in the feed of juvenile (2.5 g) white shrimp *L. vannamei*. Survival rate, growth, and pigmentation (Astaxanthin deposition).

An experiment was carried out by triplicate, on an experimental stock of *L. vannamei* juveniles, being treated under different feeding strategies. On treatment I (Control) commercial feed with 35% protein was used, according to DICTUS formulation. On treatment II, Lutein or Zeaxanthin Long Chain Diesters was added to obtain a xanthophyll concentration of 58.7 ppm. On treatment III Lutein or Zeaxanthin Long Chain Diesters was added to obtain a xanthophyll concentration of 104.7 ppm.

After 30 days in the experimental ponds, the specimens were collected. Survival rate was determined to be significantly higher (ANOVA 0.05%) on experimental ponds treated with Lutein and or Zeaxanthin Long Chain Diesters (Table II).

TABLE II

Juvenile survival of *L. vannamei*.

| | TI | TII (60 ppm Long Chain Diesters) | TIII (105 ppm Long Chain Diesters) |
|---|---|---|---|
| Survival % | 88 | 98 | 110 |

Figure 2:
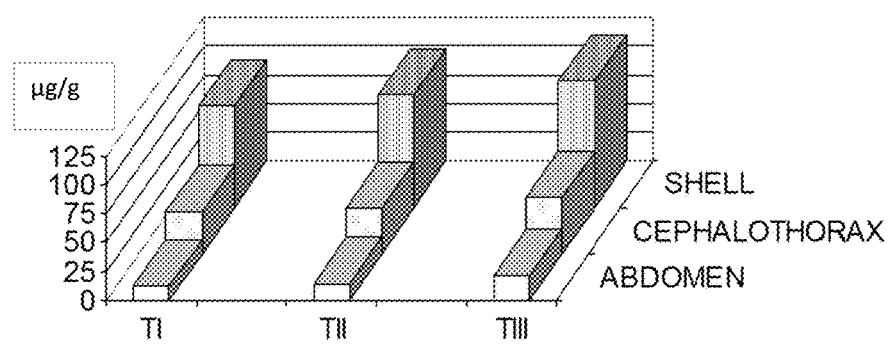
FIG. 2 is a graph showing Astaxanthin concentration in micrograms per gram of body mass on different body parts of juveniles of *L. vannamei*.

According to HPLC analysis, the Astaxanthin deposit on different body parts increased with relation to the Lutein and, or Zeaxanthin Long Chain Diesters level contained in the diet. Concentrations achieved on experimental Treatment III were significantly higher (ANOVA 0.05%) than those achieved on Treatments I and II (Graph of FIG. 2).

Example 4

4. —Dietary effect of dosing of Lutein and or Zeaxanthin Long Chain Diesters to feeds, at different dosages and over different feeding periods, on the survival rate and pigmentation of w' ite pre-adult (17.0 g) shrimp *L. vannamei*.

An experiment was carried out by duplicate of three treatments, consisting of a two-way design, to analyze the combined effect of different xanthophyll levels on feeds and feeding periods on the survival rate and pigmentation of Pre-adult white shrimp.

Treatment I considered as a feeding control was based on a diet having a protein content of 35%, according to DICTUS formulation. Experimental Treatment II feed had a protein content of 35% and Lutein or Zeaxanthin Long Chain Diesters for increasing xanthophyll concentration to 58.7 ppm; and treatment III also had a protein content of 35% with the addition of Lutein or Zeaxanthin Long Chain Diesters for increasing xanthophyll concentration to 104.7 ppm On Treatments I, II and III, experimental feeds were provided for 30 days. Afterwards the shrimp were collected.

Diets provided on treatments IV, V and VI are equivalent to those diets provided on treatments I, II and III accordingly, but were fed for a period of 60 days, after which the shrimp were collected.

Survival rate on shrimps treated with Lutein or Zeaxanthin Dipalmitates, Distearates or Dioleates was significantly higher (ANOVA 0.05%) than control treatments, for both feeding periods of 30 and 60 days. Results are shown on Table Ill.

TABLE III

Pre-adult Survival of L. vannamei.

|  | TI (Control) | TII (60 ppm Long Chain Diesters) | TIII (105 ppm Long Chain Diesters) |
|---|---|---|---|
| % S/Day 30 | 95.2 | 98.1 | 100 |
| % S/Day 60 | 93.4 | 99.2 | 100 |

According to HPLC analysis, the concentration of Astaxanthin on different body parts, after 30 days feeding period, were not significantly different (ANOVA 0.05%) between the three treatments. Although, after 60 days feeding period, concentrations of Astaxanthin on Cephalothorax and Abdomen on treatments II and Ill were significantly higher (ANOVA 0.05%) than those of treatment I. The Carapace Astaxanthin concentration on treatment Ill, was significantly higher (ANOVA 0.05%) than those of treatments I and II.

Astaxanthin concentrations recorded after the 60 days feeding period were higher than those obtained after the 30 days feeding period.

Figure 3:
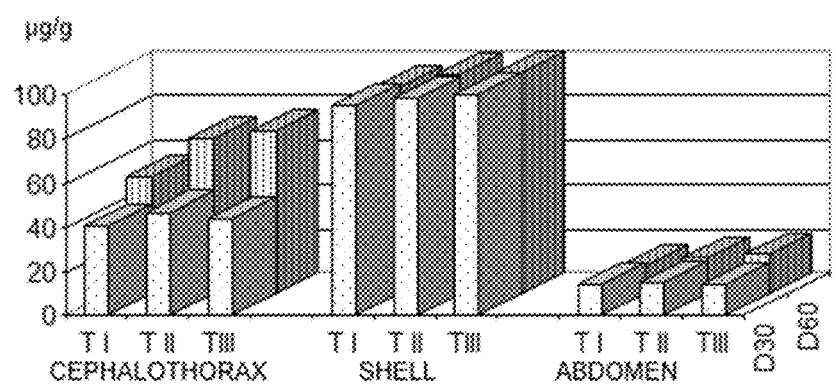
FIG. 3 is a graph showing Astaxanthin concentration on different body parts of pre-adults of *L. vannamei*.
Figure 4:
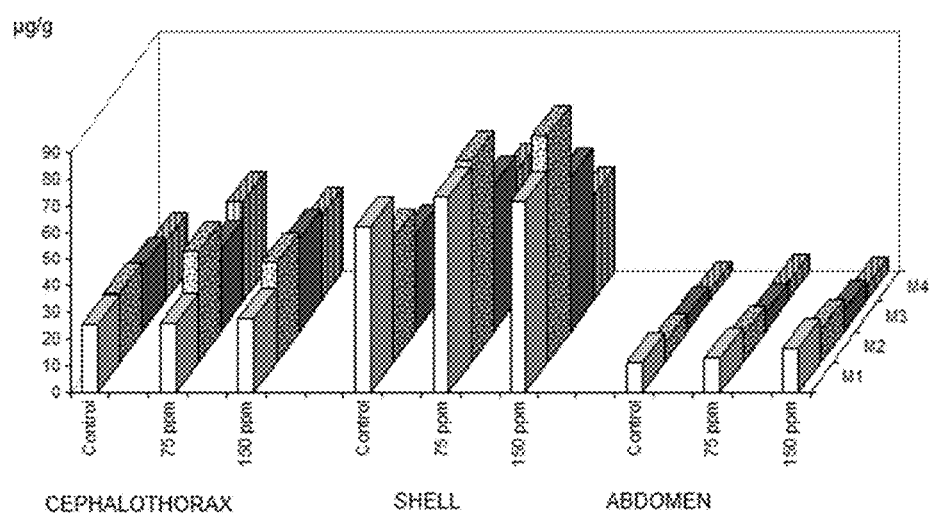
FIG. 4 is a graph showing total Astaxanthin concentration on *L. stylirostris*.

The results obtained, surprisingly show that there was a noticeable improvement in the survival rate by incorporating the Lutein or Zeaxanthin Long Chain Diesters Concentrate in the feed of shrimp, as well as an improved pigmentation as shown in the graphs of FIG. 3 and FIG. 4.

Example 5

5. —Dietary Supplementation with Lutein or Zeaxanthin Long Chain Diesters to determine Survival Rate of *Litopenaeus vannamei* in a shrimp farm in the presence of WSSV Although white spot syndrome virus (WSSV) has had a devastating economic effect on shrimp farming, variability in the severity of outbreaks that can be correlated to seasonal and environmental factors suggests an interaction between the disease and stress factors. In some cases, shrimp can survive exposure to WSSV, but the presence of stress factors can cause an acute outbreak of the disease. Treatments or management strategies that can improve the condition of shrimp can potentially increase resistance to disease, and maintain chronically infected shrimp without massive mortalities. Treatments that improve the condition of shrimp populations may increase resistance to disease and enable commercial operations to maintain chronically infected populations without massive mortalities.

The effect of dosing a Lutein or Zeaxanthin Long Chain Diester Concentrate to the feed of *Litopenaeus vannamei* on its growth and survival rates was evaluated in a grow out trial at Biocultivos Manabitas in Bahia de Caraquez, Manabi, Ecuador under conditions where the shrimp were exposed to WSSV, TSV, and IHHNV. High mortality during the trial was anticipated. To eliminate the effects of inter pond variability, the growout trial was conducted in 100, 1 m$^2$ bottomless cages in a single 0.32 hectare pond. In each cage, a 5 cm diameter directional airlift provided aeration and vertical water movement within the cage, and horizontal movement between the inside and outside of the cage. Shrimp (5.5 g at stocking) were stocked in the cages at densities of either 20 or 40 shrimp m$^{-2}$. Shrimp (3.7 g at stocking) were stocked outside the cages at a density of 8.2 shrimp m$^{-2}$. Prior to stocking, shrimp had been reared from PL in lined ponds, and had survived exposure to WSSV. Water treatment during filling and the eight week growth trial were similar to that used for surrounding commercial culture ponds.

Shrimp were fed 0.20 g feed shrimp$^{-1}$ day$^{-1}$ inside the cages and 0.14 g feed shrimp$^{-1}$ day$^{-1}$ outside the cages. For shrimp inside the cages, feeds with three different content levels of Lutein or Zeaxanthin Long Chain Diesters were compared to a feed without any content of Carotenoids. For shrimp outside the cages, the feed without Carotenoids Concentrates was used. Proximate and carotenoid analyses of the feeds are shown in Table IV. The Feed was provided in the form of pellets and were provided to the cages 5 times a day. Lutein or Zeaxanthin Long Chain Diesters was mixed with fish oil and sprayed on the pellets after drying. Shrimp were fed with the experimental feeds for the first 23 days of the growth trial. After analyzing the feeds, it was found that carotenoid levels were below target levels in the feeds having 150 and 225 ppm, the content levels were corrected by spraying additional Lutein or Zeaxanthin Long Chain Diesters on the pellets. The feed having the correct amount of 150 ppm was provided for the remaining of the trial days (days 24-56). The feed having the correct amount of 225 ppm feed, which was used for days 24-35, was still below the target level. The carotenoid level was corrected again and used for the remainder of the trial days (days 36-56).

TABLE IV

Proximate Analysis and Carotenoid Content of Feeds

| Feed (ppm carotenoid) | 0 | 75 | 150 | 225 |
|---|---|---|---|---|
| Proximate analysis (%)* | | | | |
| Protein | 30 | 34 | 36 | 36 |
| Lipid | 5 | 9 | 9 | 8 |
| Fiber | 3 | 2 | 2 | 2 |
| Ash | 9 | 8 | 8 | 8 |
| Carotenoid (ppm)** | | | | |
| June 1-23 | 13 | 67 | 108 | 96 |
| June 24-July 5 | 18 | 68 | 142 | 186 |
| July 6-27 | 18 | 68 | 142 | 232 |

*Laboratorio de Alimentos, Medicamentos y Toxicologia, Universidad Autonoma de Nuevo Leon, San Nicolas de Los Garza, N.L., Mexico
**Research and Development Department, Industrial Organica, S.A., Monterrey, N.L., Mexico Growth and Survival Growth and survival at harvest was analyzed by a two-way variance analysis. Interactions between stocking density and diet were not significant for either growth or survival (P=0.5147 and 0.4515, respectively).

Survival (FIG. 1) was greater at the stocking density of 20 shrimp/m$^2$ than at 40 shrimp/m$^2$ (P=0.0001). At 20 shrimp/m$^2$, survival ranged from 21 to 70%, and at 40 shrimp/m$^2$, ranged from 7 to 39%. At both stocking densities, survival was greater for the fed shrimps than for the unfed shrimp (P=0.0001). At both stocking densities, survival was greater with the feed containing Lutein or Zeaxanthin Long Chain Fatty Acids than with the feed without Lutein or Zeaxanthin Long Chain Diesters (P=0.0005). Differences in survival between feeds containing Lutein or Zeaxanthin Long Chain Fatty Acids were not significant (P=0.2458).

Pathological Analysis

At harvest, there was sampled hemolymph from the shrimp fed containing from 0 to 150 ppm of carotenoid at the stocking density of 20 shrimp/m$^2$ for pathological analysis. PCR tests for IHHNV and WSSV, and immune-blot dot tests for IHHNV, WSSV, and TSV indicated high levels of infection by all three viruses in both groups of shrimp.

Figure 5:
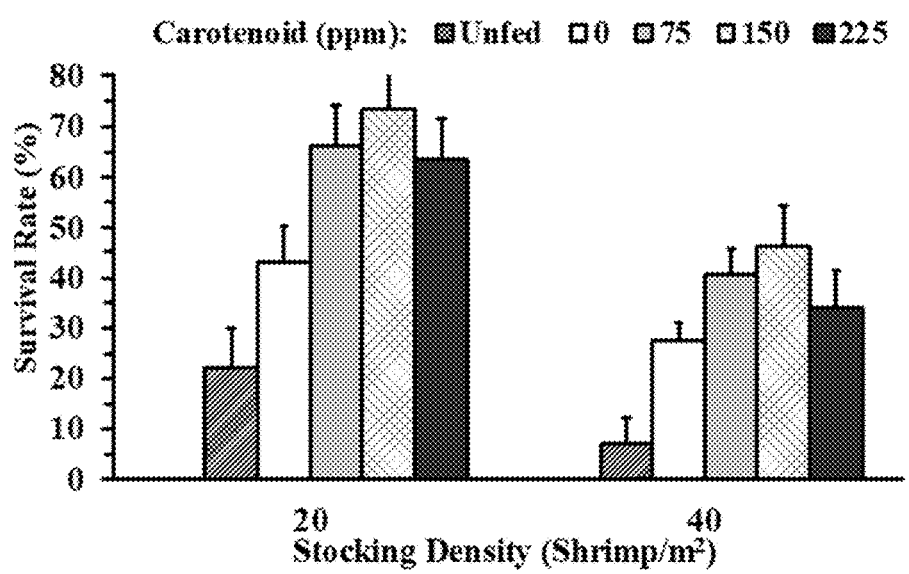
FIG. 5 is a graph showing the effect of carotenoid level on survival of shrimp in the presence of WSSV, IHHNV, and TSV infections.

The growth trial demonstrated that the dosing of Lutein or Zeaxanthin Long Chain Diester Concentrate surprisingly increased the survival of shrimp in the presence of WSSV, IHHNV, and TSV infections as shown in the graph of FIG. 5.

Example 6

6. —Effects of different sources and doses of carotenoids in the balanced feed, growout, survival, and deposition of pigments in white shrimp L. vannamei.

The following is a review of the results obtained regarding the dosing of Lutein/Zeaxanthin Long Chain Diesters in the feed, as compared to feed that contained synthetic Astaxanthin (Carophyll Pink). The average survival and final weight results of the experimental work with shrimp L. vannamei results, obtained after a 60 day treatment, are shown in Table V:

TABLE V

| TREATMENT | FINAL WEIGHT grs | SURVIVAL % | ASTAX. IN HEAD* | ASTAX. IN MUSCLE* | ASTAX. IN SHELL* |
|---|---|---|---|---|---|
| Control | 7.55 | 61.11 | 27.4 | 9.3 | 50.4 |
| ROCHE Astaxanthin 75 ppm | 7.77 | 63.33 | 29.2 | 11.4 | 75.1 |
| Long Chain Diesters 75 ppm | 7.88 | 69.4 | 42.5 | 18.5 | 74.8 |
| Long Chain Diesters 100 ppm | 8.86 | 84.2 | 43.3 | 19.7 | 77.9 |
| Long Chain Diesters 200 ppm | 8.89 | 86.9 | 45.7 | 21.2 | 82.5 |

*micrograms of Astaxanthin per gram of tissue in the head (hepathopanchreas), muscle and shell (carapace)

Differences observed on the final weights were not statistically significant. On the other hand, survival rates were statistically significant, and their value increased in direct ratio to the increment of Lutein or Zeaxanthin Long Chain Diesters dosage.

Astaxanthin deposition using 75 ppm of Long Chain Diesters was similar to that obtained with 75 ppm of synthetic Astaxanthin, differences observed were not statistically significant in any of the three body parts analyzed by HPLC.

This indicates that the Long Chain Diesters of Lutein or Zeaxanthin are efficiently incorporated on the different tissues and body parts, and the energetic cost of this metabolic change is definitely despicable, as it is not reflected statistically on the growth performance.

Example 7

7. —Comparison of the different Astaxanthin enantiomers deposited by P. monodon that were given the following three different diets: commercial feed as control; commercial feed containing 120 ppm of Lutein or Zeaxanthin Long Chain Diesters Concentrate; and commercial feed that contained 60 ppm of synthetic Astaxanthin (Carophyll Pink).

An evaluation was carried on a commercial operation to determine the effect of feeding P. monodon shrimp with the same commercial feed that contained:
a) no extra carotenoid,
b) 120 ppm of Long Chain Diesters, and
c) 60 ppm of synthetic Astaxanthin (Carophyll Pink)

The specimens were seeded at 30/m², pl 7, in aerated and lined ponds. The ponds sizes were 0.25 Ha each.

Five ponds selected at random were fed with the feed containing no added carotenoid.

Five additional ponds, randomly selected were given feed containing 120 ppm of Lutein or Zeaxanthin Long Chain Diesters, and Another five ponds located at random, were given feed containing 60 ppm of synthetic Astaxanthin (Carophyll Pink)

All ponds were seeded the same date with pl of the same origin. Water quality was uniform, as well as the fertilization and management of the ponds. Natural production of phytoplankton and zooplankton was abundant in all the ponds.

At three grams weight, the ponds were sampled, the specimens were lyophillized and the dehydrated samples were ground and analyzed.

The concentration of total pigment in the crustacean specimens extract was carried out by UV/Vis spectrophotometric methods measurement absorbance at 470 nm (A 1%=2100 in hexane).

The results obtained were as follows:
Ponds with Long Chain Diesters treatment: 183.7 ppm
Ponds with Carophyll Pink: 152.5 ppm
Control ponds: 151.0 ppm The analysis of Astaxanthin R/S enantiomers deposited by the crustacean specimens, were quantified by HPLC after derivatization into the corresponding dicamphanates (Vecchi and Muller 1979), in order to differentiate the Astaxanthin enantiomers. The results were as follows:
Control Ponds:
3R,3'R Astaxanthin (Cis+Trans): 14.2%
3R, 3'S Meso-Astaxanthin (Cis+Trans): 37.2%
3S, 3'S Astaxanthin (Cis+Trans): 48.5%
Ponds with Long Chain Diesters Treatment:
3R, 3'R Astaxanthin (Cis+Trans) 15.8%
3R,3'S Meso-Astaxanthin (Cis+Trans): 38.2%
3S, 3'S Astaxanthin (Cis+Trans): 45.9%
Ponds with Carophyll Pink Treatment:
3R, 3'R Astaxanthin (Cis+Trans): 15.1%
3R,3'S Meso-Astaxanthin (Cis+Trans): 37.6%
3S, 3'S Astaxanthin (Cis+Trans): 47.3%

As it can be observed, there is no statistical difference in the proportion of the different Astaxanthin enantiomers deposited by P. monodon in any of the three different treatments.

The above suggests that P. monodon shrimp have the capability to convert and deposit the Lutein or Zeaxanthin Long Chain Diesters; as well as the precursors found in the phytoplankton and zooplankton of the control ponds; as well as the Astaxanthin contained in the Carophyll Pink. In all three instances, the crustacean showed the capability to provide identical depositions, starting from different sources and following a unique metabolic pathway. To our knowledge, there is no report of such discovery.

What is claimed is:

1. A method for improving a survival rate of a crustacean population, comprising:
   incorporating a Carotenoids Concentrate, having a content of Lutein or Zeaxanthin Long Chain Diesters comprising from 10 to 90% of the total xanthophylls, in crustaceans feeds, wherein
   the survival rate is improved by a percentage of from 61% to 86% with respect to populations on a diet having a protein content of 35%, according to DICTUS formulation.

2. The method as claimed in claim 1, wherein the Carotenoids Concentrate with a content of Lutein or Zeaxanthin Long Chain Diesters, are dosed in crustaceans feeds in an amount of from 10 ppm to 500 ppm.

3. A method for improving a survival rate of a crustacean population, comprising:
   incorporating a Carotenoids Concentrate having a content of Lutein or Zeaxanthin Long Chain Diesters obtained from marigold oleoresin with a total xanthophylls content of 75 gr/kg to 150 gr/kg, in crustacean feeds, wherein
   the survival rate is improved by a percentage of from 61% to 86% with respect to populations on a diet having a protein content of 35%, according to DICTUS formulation.

4. A method for improving a survival rate of a crustacean population, comprising:
   incorporating a Carotenoids Concentrate having a content of Lutein or Zeaxanthin Long Chain Diesters obtained from *capsicum* species meal with a total xanthophylls concentration of 3 gr/kg to 16 gr/kg, in crustacean feeds, wherein
   the survival rate is improved by a percentage of from 61% to 86% with respect to populations on a diet having a protein content of 35%, according to DICTUS formulation.

* * * * *